April 29, 1924.
W. F. JAMISON
1,492,465
DIVISIBLE DEMOUNTABLE RIM
Filed July 18, 1921  2 Sheets-Sheet 1
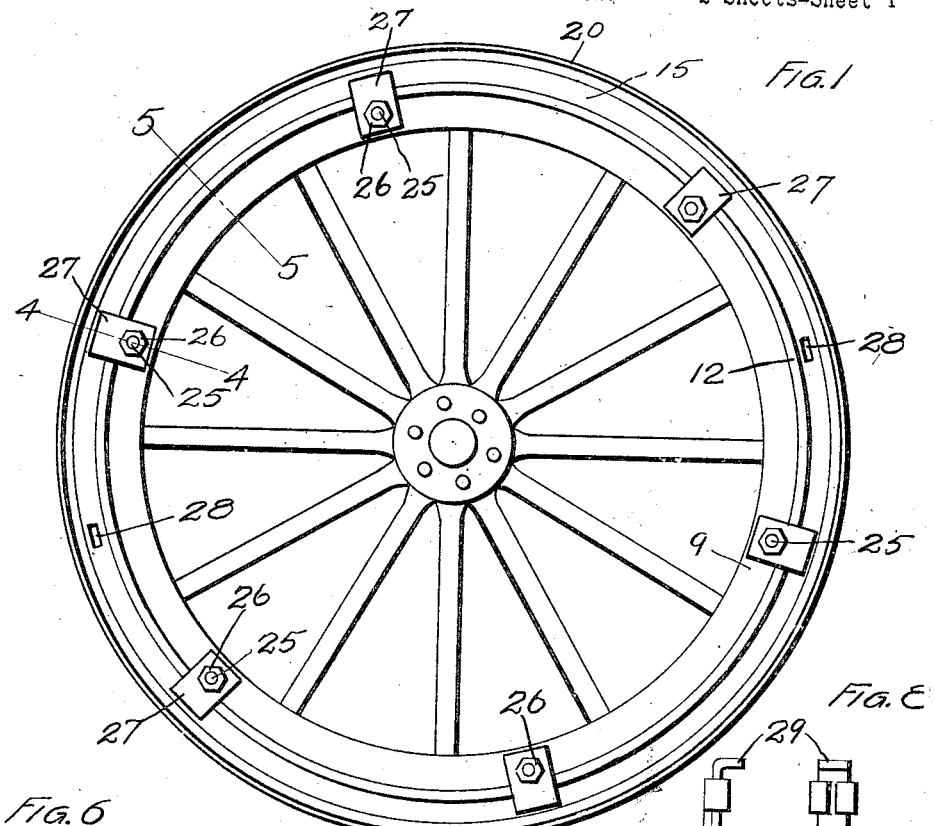
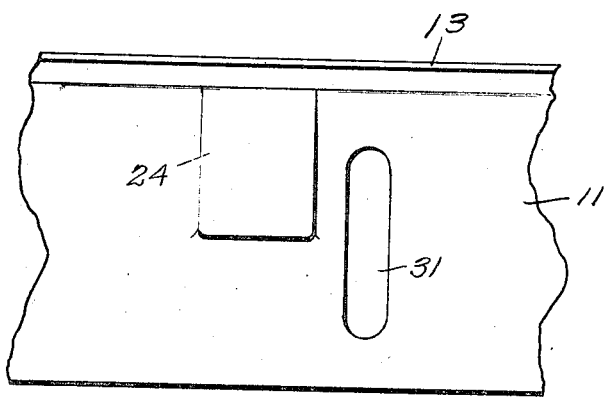
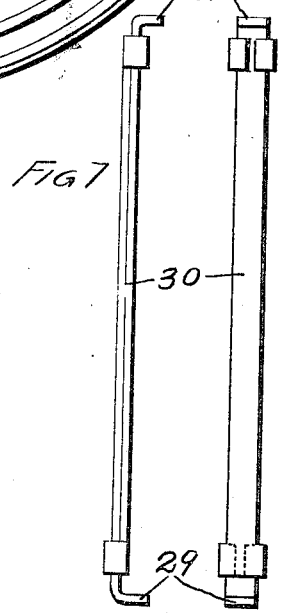
INVENTOR
WILLIAM F. JAMISON
By Edward E. Longan
ATTY.

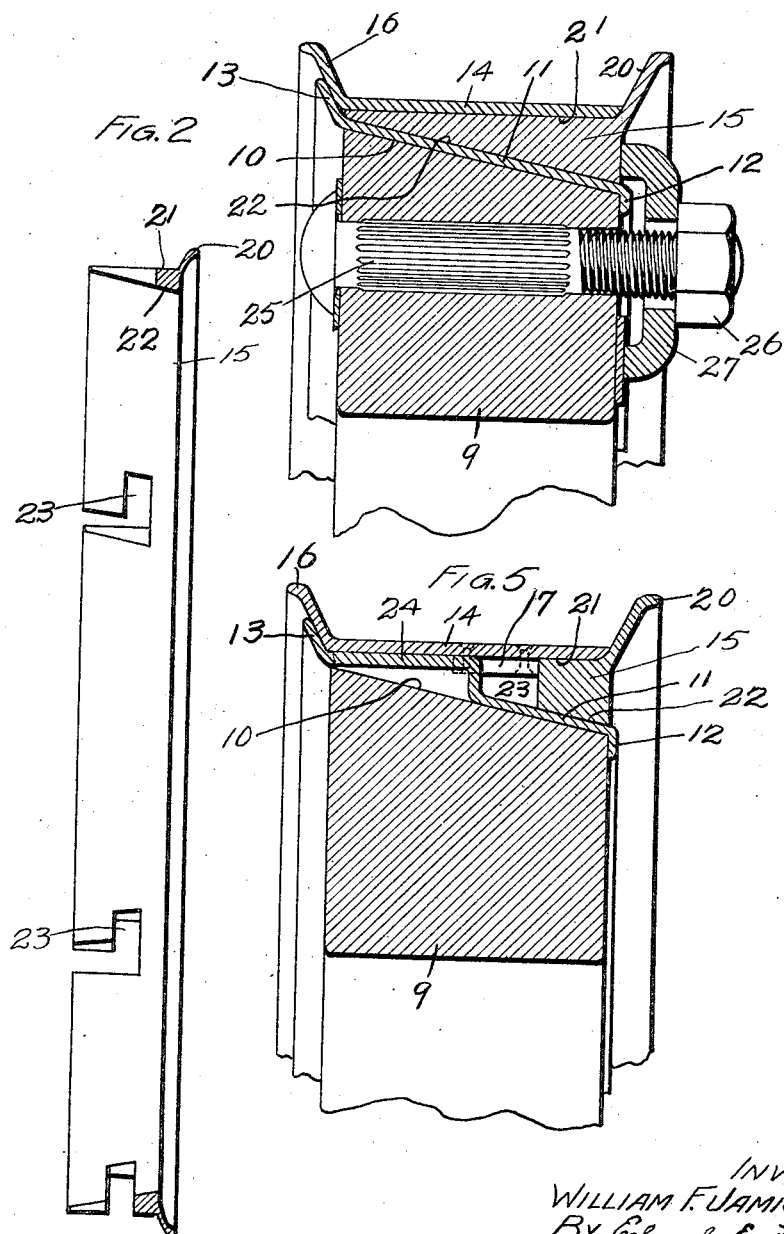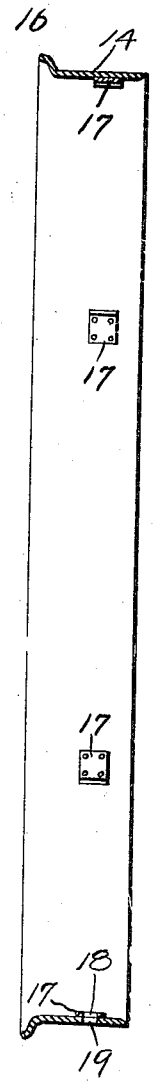

Patented Apr. 29, 1924.

1,492,465

UNITED STATES PATENT OFFICE.

WILLIAM F. JAMISON, OF ST. LOUIS, MISSOURI.

DIVISIBLE DEMOUNTABLE RIM.

Application filed July 18, 1921. Serial No. 485,409.

*To all whom it may concern:*

Be it known that I, WILLIAM F. JAMISON, a citizen of the United States, and resident of the city of St. Louis and State of Missouri, have invented certain new and useful Improvements in Divisible Demountable Rims, of which the following is a specification, containing a full, clear, and exact description, reference being had to the accompanying drawings, forming a part hereof.

My invention relates to divisible demountable rims, and has for its primary object a demountable rim composed of two circular telescoping sections which are adapted to be interlocked.

A further object is to construct a divisible demountable rim composed of two circular sections, each section provided with a single flange, the sections adapted to telescope within each other and to be locked when so telescoped against coming apart.

A still further object is to construct a rim of two telescopic circular sections which are adapted to be locked when telescoped and which can be readily removed from or placed on a wheel rim when in telescoped position.

In the drawings,

Fig. 1 is a side elevation of my device with the rim in position.

Fig. 2 a cross sectional view of one of the rim members.

Fig. 3 a similar view of the other rim member.

Fig. 4 an enlarged section taken on the line 4—4 of Fig. 1.

Fig. 5 an enlarged cross section taken on the line 5—5 of Fig. 1.

Fig. 6 an enlarged plan view of a portion of the wheel tire showing the locking lugs and valve stem slot.

Fig. 7 a side elevation of the rim unlocking tool.

Fig. 8 a face view of the same.

In the construction of my device I employ a wheel having a hub and spokes and a felloe 9. This felloe has its outer surface beveled or inclined as indicated by the numeral 10.

Secured around the outer surface of the felloe is fixed rim or felly band 11. This rim being for the purpose of securing the felloe in position on the spokes. The felly band is provided with a downwardly projecting flange 12 and an upwardly projecting flange 13. The downwardly projecting flange preventing the rim 11 from creeping upward on the inclined face 10 when the demountable rim is secured in position thereon. The demountable rim consists of the members 14 and 15. The member 14 being circular in form and provided with an outwardly and upwardly extending flange 16. This flange may be either as illustrated in the drawings, when used for a straight side tire, or it may be in the shape of a hook for clincher tires.

Secured to the inner surface of the member 14 are lugs 17, one of which is provided with an opening 18 which registers with the opening 19 formed in the member 14 and is for the purpose of permitting the valve stem of a pneumatic tire to pass therethrough. The member 15 is provided with an outwardly and upwardly extending flange 20, this is of the same construction as the flange 16 and may also be made for use on a clincher tire. The member 15 has its outer surface 21 flat so as to telescope within the member 14 while the inner surface 22 is inclined so that it will lie snugly against the felly band 11. The member is further provided with bayonet slots 23 in which the lugs 17 are designed to be inserted. After the lugs have been inserted in the bayonet slots, a slight twist will lock the rim members 14 and 15 together. Formed at intervals in the felly band 11 are projections 24. These projections are adapted to enter a portion of the bayonet slots and keep the locked rims from turning on the wheel. This is clearly illustrated in Fig. 5. The projection 24 extends far enough into the bayonet slot to also lock the lugs 17 and prevent the rim member 13 from turning which would have a tendency to cause the members to become unlocked. Extending through the felloe 9 are bolts 25 which are provided with nuts 26 for securing the lugs 27 which hold the telescoped rim in position on the wheel. The rim member 15 is also provided with openings 28. These openings are diametrically opposite each other and are for the purpose of receiving the projecting ends 29 of the rim unlocking tool 30. This unlocking tool is made in two sections so that it can be spread apart to take care of various sized rims.

When it is desired to mount a tire on my improved rim, the members 14 and 15 are first taken apart, the tube inserted in the casing and the casing and tube then slipped on the member 14. The valve stem being inserted through the openings 18 and 19 after the casing has been placed in position on the member 14, the member 15 is placed within the member 14 in such a position that the lugs 17 will enter the bayonet slots. The valve stem passing through one of the lugs 17, will thus enter into one of the bayonet slots. The ends 39 of the locking tool 30 are then inserted in the openings 28 and the member 15 rotated so that the lugs pass into the blocking portion of the bayonet slot. The tire may then be inflated without any danger of the rim sections or members coming apart. When it is desired to mount the rim on the wheel, the valve stem is inserted through the slot 31 which is formed through the felly band 11 and through the felloe 9. The rim is then pushed forward. This allows the projections 24 to enter the bayonet slots—the continued forward pushing of the rim then causes the flanges 16 to contact with the flange 13 after which the lugs 27 are secured in place and the wheel and rim thus securely locked together. The demounting of a tire, is of course, exactly the reverse of mounting. By the use of my device there are no split rims to spring out of shape, no split rings to remove, no prying of beads over flanges which later causes stretching the bead and consequent loose fitting of the tire, nor is any hammering necessary which not only destroys the paint on the rims and wheel, but also batters up the rim. Another feature of my device is that the rim is positively held on the wheel against any slipping movement whatever and does not depend upon friction or spring as is the case where wedge shaped lugs are used to hold the rim in place on the wheel.

Having fully described my invention, what I claim is:

1. A divisible demountable rim comprising a pair of telescopic sections, each provided on one edge with an upwardly extending outwardly flaring flange, one of said sections being triangular in cross section and provided with bayonet slots in the edge opposite said flange, said section adapted to fit within the other section, and fixed lugs carried by the second mentioned section on its inside surface for engaging with the bayonet slots of the first mentioned section whereby said sections are secured together.

2. A divisible demountable rim comprising a pair of ring sections, one of which is adapted to fit within the other, the inner section being substantially triangular in cross section and provided in its thin edge with bayonet slots and at its thicker edge with an outwardly and upwardly extending flange, the outer section adapted to have one edge contact with the flange of the first mentioned section and being provided on its opposite edge with an outwardly and upwardly extending flange and having lugs fixedly secured on its inner surface, said lugs adapted to enter the bayonet slots for securing the sections together against lateral movement.

3. A divisible demountable rim comprising a pair of ring sections, one adapted to fit within the other, the inner section being substantially triangular in cross section and provided in its thin edge with bayonet slots and with an outwardly and upwardly extending flange on its opposite edge, the outer section adapted to be slipped over the inner section and having one edge contact with the flange of the inner section so as to form an uninterrupted smooth base for an automobile tire, a flange extending upwardly and outwardly formed on the opposite edge of said outer section, rectangular lugs fixed to the inner surface of the outer section and adapted to enter the bayonet slots for securing the sections together against removal.

In testimony whereof, I have signed my name to this specification.

WILLIAM F. JAMISON.